Nov. 17, 1931.                F. P. YOUNGBLOOD                1,832,827
                       APPARATUS FOR PREPARING LIQUID FUELS
                         Filed Dec. 12, 1929          2 Sheets-Sheet 1
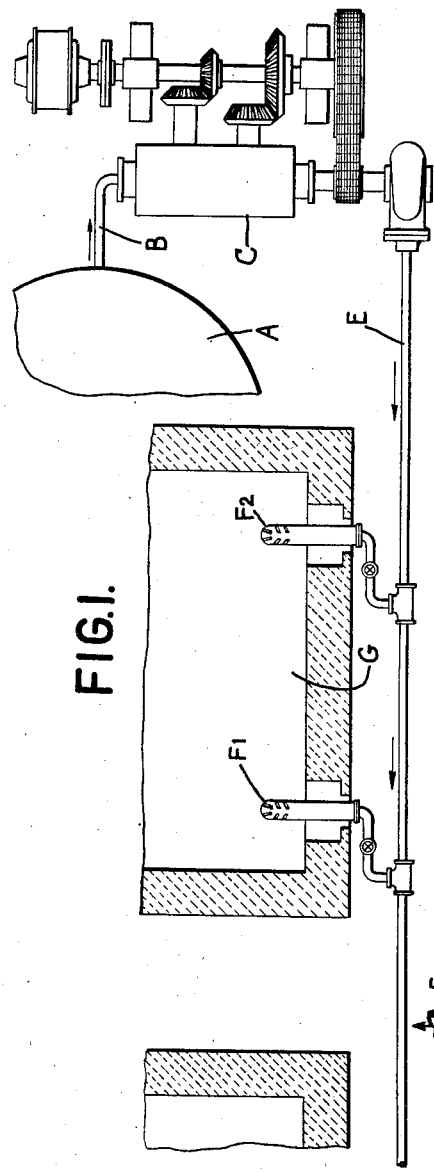
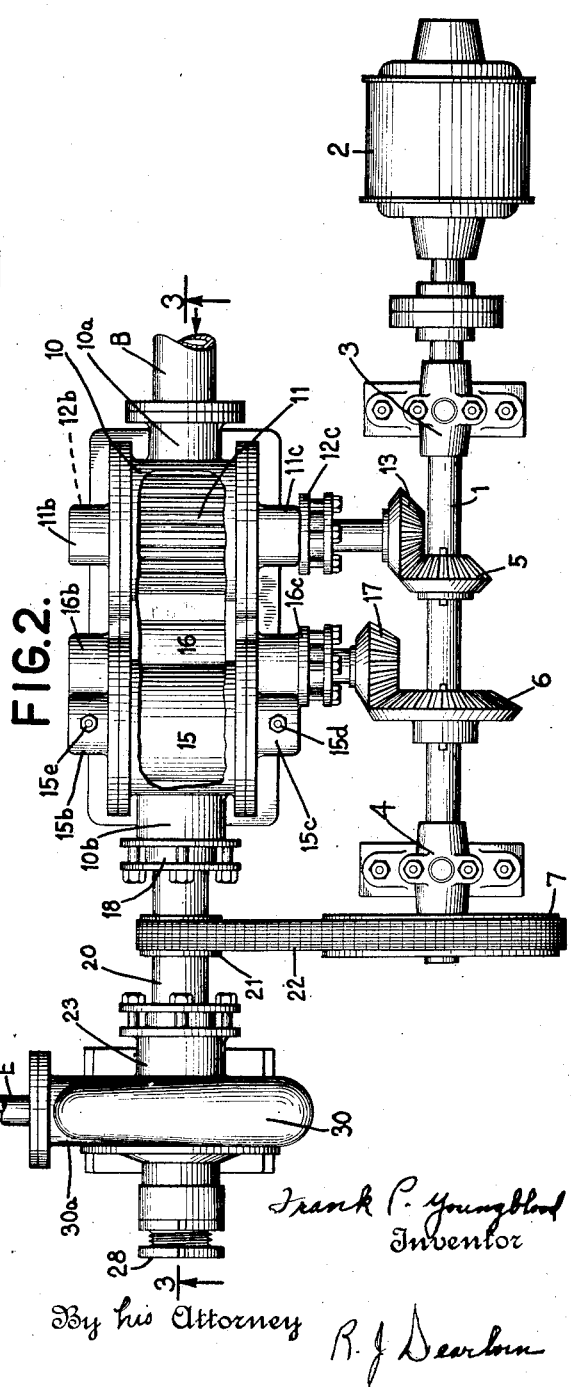

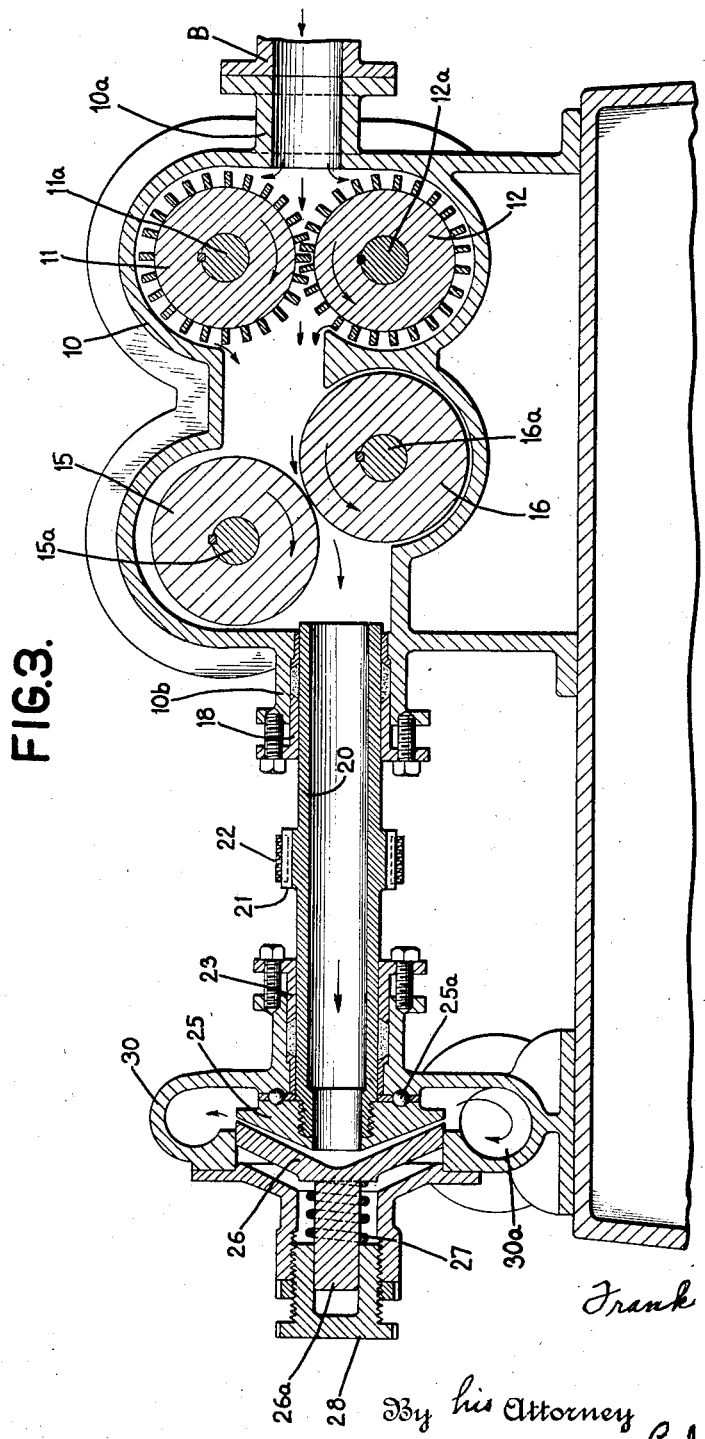

Patented Nov. 17, 1931

1,832,827

UNITED STATES PATENT OFFICE

FRANK P. YOUNGBLOOD, OF PORT ARTHUR, TEXAS, ASSIGNOR TO THE TEXAS COMPANY, OF NEW YORK, N. Y., A CORPORATION OF DELAWARE

APPARATUS FOR PREPARING LIQUID FUELS

Application filed December 12, 1929. Serial No. 413,478.

The present invention relates to an apparatus for preparing fluid fuels and relates more specifically to an apparatus for breaking up and dispersing chunks of agglomerated solids and dissolving lumps of tarry material in a liquid fuel.

The invention is particularly adapted to the preparation of fuels, which may be easily handled as by pumping, from waste products about a refinery, such as residual liquid fuel oils, tarry residues, acid sludge resulting from the acid treatment of lubricating oils, the coke-like scrapings from stills, etc.

Therefore the main object of this invention is to provide an apparatus for preparing a fluid fuel from liquid and tarry or pitch-like lumps and agglomerated solids by effecting a heterogeneous mixture of the different substances and subsequently digesting and intimately mixing or converting them into a more nearly homogeneous mixture.

This and other objects and advantages of the invention will be better understood from the following description taken in connection with the accompanying drawings in which:

Fig. 1 is a plan view of apparatus constructed according to the invention taken in conjunction with suitable apparatus for utilizing the prepared fuel.

Fig. 2 is a plan view of the apparatus alone.

Fig. 3 is a view in elevation taken on the line 3—3 of Fig. 2.

Referring now to the drawings and to Fig. 1 in particular, proper amounts of the different waste products are delivered into a suitable tank A where they are kept agitated and a mixture of the constituents, to be more intimately mixed, is discharged through a line B from the tank A into a mixing or digesting apparatus C where the tarry lumps and agglomerated solids are dissolved and disintegrated in the liquid constituent to thereby form a fluid mixture of a more nearly homogeneous nature.

The intimate mixture of liquid, liquefied and pulverized constituents is delivered from the apparatus C through a pipe E to suitable burners F1 and F2 situated in a furnace G.

Referring now to Fig. 2 and Fig. 3 the drive shaft 1 rigidly attached to a motor 2 and rotatably supported by bearing supports 3 and 4 serves as a rigid mounting for a miter gear 5 and a bevel gear 6 and a chain wheel 7.

A material inlet connection 10a, which forms a connection for the pipe B, is preferably made integral with a main chamber or housing 10, which incloses and supports a pair of mangles or digesting gears 11 and 12, a pair of rollers 15 and 16 and has an outlet connection 10b, which is also preferably made integral with the chamber 10. The gear 11 is mounted on a suitable shaft 11a which is rotatably supported in niches 11b and 11c in the housing 10 and is loosely meshed with the gear 12, which is rigidly mounted on a suitable shaft 12a, one end of which is rotatably supported in a niche 12b in the housing 10 while the other end is projected through a suitable stuffing gland 12c and has rigidly mounted thereon a miter gear 13, which is meshed with and rotated by the miter gear 5.

An idler roller 15 rigidly mounted on a shaft 15a rotatably supported in niches 15b and 15c in the housing 10 cooperates with a companion roller 16 rigidly mounted on a shaft 15a, one end of which is supported in a niche 16b while the other end is projected through a suitable stuffing gland 16c and has rigidly mounted thereon a bevel gear 17, which is meshed with and rotated by the bevel gear 6. The roller 15 normally rests upon the face of the roller 16 and set screws 15d and 15e are provided to limit the distance which the roller 15 may be moved away from or raised off of the face of the roller 16.

A rotatable member preferably in the form of shaft or barrel 20 has one end rotatably mounted in a stuffing gland 18 and the other end rotatably mounted in a stuffing gland 23. A chain wheel 21 is rigidly mounted on the shaft 20 and a silent chain 22 which cooperates with the chain wheel 21 also cooperates with the chain wheel 7.

A grinding arrangement composed of a rotating frusto-conical member 25, which is mounted on a hollow shaft 20, having a suitable thrust bearing 25a and a concave stationary member 26, is contained in a suitable housing 30 having an outlet 30a which forms a connection for the pipe E. The concave member 26 is capable of horizontal adjustment having the helical spring 27 and an adustment screw 28 cooperating with a projecting portion 26a.

The motor 2 having the directly connected shaft 1, preferably operates at 200 R. P. M. and the miter gear 5 rigidly mounted on the shaft 1 causes the miter gear 13, the shaft 12a, the gear 12 and the idler gear 11, which is meshed with the gear 12, to rotate at a rate of 200 R. P. M. while the bevel gear 6 causes the bevel gear 17, the shaft 16a, the roller 16 and idler roller 15 to rotate at a rate of 400 R. P. M. and the chain wheel 7 through the chain 22 causes the chain wheel 21, the hollow shaft 20 and the grinding element 25 to rotate at a rate of 600 R. P. M.

It will thus be seen that as the mixture of materials to be digested is delivered through the connection 10a into the main chamber 10, the gears 11 and 12 receive the mixture and passing it therebetween, mangle or break it up and then pass it on to the rollers 15 and 16, which serve to roll out any lumps or particles or tarry matter and to pulverize any agglomerated chunks of solids which might remain, and the mixture delivered therefrom is passed through the hollow rotating shaft or barrel 20, wherein some mixing is accomplished, to the grinding arrangement, which rotates at a relatively high rate of speed where any remaining chunks and solids are thoroughly ground or reduced to minute proportions and then by the whirling motion of the element 25 are dispersed and dissolved or intimately mixed together in the surrounding chamber 30 before being discharged from the mixer.

There will be no lag or back pressure caused in the feeding of the mixture to any of the different parts of the apparatus in the auxiliary enclosures or zones of the mixer C, as the different parts are operated at progressively increased speeds so that the successive parts of the mixer are capable of receiving the mixture faster than the preceding parts are capable of delivering it.

It is obvious that the present embodiment of the invention may be modified in various ways without affecting the spirit and scope of the invention and it is desired that it be limited only by the following claims.

I claim:

1. Apparatus for preparing fluid fuel from a heterogeneous mixture comprised of a chamber having an inlet and an outlet containing a pair of loosely meshed rotating gears for mangling the mixture and a pair of rotating rollers for rolling the mixture, a rotating barrel for further mixing the partially digested mixture, a grinding arrangement for reducing remaining chunks and solids to minute proportions and a chamber for intimately mixing the components before discharge.

2. A system for preparing liquid fuels comprising a tank for holding a heterogeneous mixture of fuel constituents, a digesting chamber, a hollow rotatable member, a grinding unit, connections for passing the fuel successively from the tank through the digesting chamber, the hollow member and the grinding unit and means for delivering a finished fuel from the grinding unit to burners.

3. In an apparatus for preparing liquid fuels from heterogeneous fuel constituents the combination of a digesting chamber having an inlet and an outlet, means in said digesting chamber for breaking up large pieces of solids and then pulverizing said pieces, a hollow shaft adapted to be rotated for mixing the pulverized pieces and liquids, a grinding mechanism, connections for passing the fuel particles from the digesting chamber to the shaft and from the shaft to the grinding mechanism, and adjustable grinding elements in said mechanism for producing a substantially homogeneous fuel mixture.

4. In an apparatus for preparing liquid fuels the combination of a digesting chamber having a pair of meshed gears and a pair of contacting rollers for successively mangling and pulverizing solid particles, a rotatable hollow shaft, a grinding mechanism comprising a circular casing containing conical grinding elements, at least one of which elements is actuated by said rotatable shaft, said mechanism being adapted to reduce to minute proportion the fuel particles and to give a whirling motion thereto for intimately mixing the ingredients of the fuel, drive connections for operating said gears, rollers and rotatable shaft and a prime mover cooperating with said drive connections.

In witness whereof I have hereunto set my hand this 14th day of November, 1929.

FRANK P. YOUNGBLOOD.